United States Patent
Issagholian-Havai (12) 
(10) Patent No.: US 6,561,553 B1
(45) Date of Patent: May 13, 2003

(54) ANGLE PLATE FASTENING METHOD AND APPARATUS FOR AIR DUCT FLANGE CONNECTORS

(76) Inventor: Robert Issagholian-Havai, 5119 Azusa Canyon Rd., Baldwin Park, CA (US) 91706

( * ) Notice: Subject to any disclaimer, the term of this patent is extended or adjusted under 35 U.S.C. 154(b) by 0 days.

(21) Appl. No.: 09/706,884

(22) Filed: Nov. 3, 2000

Related U.S. Application Data
(60) Provisional application No. 60/165,811, filed on Nov. 16, 1999.

(51) Int. Cl.[7] ............................... F16L 23/00
(52) U.S. Cl. ................ 285/405; 285/424; 411/354
(58) Field of Search ................ 285/405, 424; 24/498; 411/354, 551, 552, 553

(56) References Cited

U.S. PATENT DOCUMENTS

| | | | | |
|---|---|---|---|---|
| 917,583 A | * | 4/1909 | Gilbert | 138/165 |
| 4,410,206 A | * | 10/1983 | Mez | 285/405 |
| 5,352,000 A | * | 10/1994 | Issagholian-Havai et al. | 285/405 |

* cited by examiner

*Primary Examiner*—Lynne H. Browne
*Assistant Examiner*—G M Collins
(74) *Attorney, Agent, or Firm*—Tod R. Nissle, P.C.

(57) ABSTRACT

A method and apparatus secure together a pair of opposing angle plates which are each mounted on one of an opposing pair of flange connectors that are each attached to the end of a different one of the opposing ends of a pair of sheet metal ducts. The apparatus includes a pair of interfitting members that include a cam surface to interlock the members to compress together the opposing pair of flange connectors.

6 Claims, 5 Drawing Sheets

ANGLE PLATE FASTENING METHOD AND APPARATUS FOR AIR DUCT FLANGE CONNECTORS

This application claims the benefit of Provisional Application No. 60/165,811 filed Nov. 16, 1999.

This invention relates to angle plates.

More particularly, the invention relates to a method and apparatus for securing together a pair of opposing angle plates which are each mounted on one of an opposing pair of flange connectors that are each attached to the end of a different one of the opposing ends of a pair of sheet metal ducts.

Connection assemblies for air ducts are well known in the art. See, for example, my U.S. Pat. No. 5,352,000. In a conventional connection assembly a first duct has a rectangular end. A second duct also has a rectangular end with a shape and dimension equivalent to that of the end of the first duct. The end of the first duct is positioned near and opposing the end of the second duct. Each duct end includes four interconnected linear duct edges which collectively define a rectangle. Each coterminating pair of duct edges is normal or perpendicular. A rectilinear flange connector is mounted on each edge of the duct ends. Consequently, the end of the first duct has four flange connectors. Each connector is mounted on a different one of the edges at the end of the first duct. Similarly, the end of the second duct has four flange connectors. Each connector is mounted on a different one of the edges of the end of the second duct. The flange connectors on the end of the first duct are parallel to and adjacent the flange connectors on the end of the second duct.

A first pair of the flange connectors on the end of the first duct are parallel and spaced apart. The remaining or second pair of the flange connectors on the end of the first duct are also parallel and spaced apart. The first pair of flange connectors on the first duct is perpendicular to the second pair of flange connectors on the first duct. Each of the first pair of flange connectors includes two ends. Each of these ends (1) is adjacent an end of one of the second pair of flange connectors, and (2) is connected with an angle plate to the adjacent end of one of the second pair of flange connectors. Consequently, there are a total of four angle plates used on the end of the first duct. An aperture is formed through each angle plate.

In a manner identical to that just described for the first duct, a first pair of the flange connectors on the end of the second duct are parallel and spaced apart. The remaining or second pair of the flange connectors on the end of the second duct are also parallel and spaced apart. The first pair of flange connectors on the second duct is perpendicular to the second pair of flange connectors on the second duct. Each of the first pair of flange connectors includes two ends. Each of these ends (1) is adjacent an end of one of the second pair of flange connectors, and (2) is connected with an angle plate to the adjacent end of one of the second pair of flange connectors. The angle plates are mounted at the corners of the duct. Consequently, there are a total of four angle plates used on the end of the second duct. An aperture is formed through each angle plate.

Each angle plate on the end of the first duct is in registration with, contacts, and opposes an angle plate on the end of the second duct such that (1) the aperture formed in the angle plate on the first duct is in registration with the aperture formed in the angle plate on the second duct, and (2) a bolt can be passed through the apertures which are in registration and a nut used to secure together the opposing, contacting, registered angle plates. While using a nut and bolt forms a secure connection between opposing angle plates (and between the flange connectors in which the plates are mounted), inserting the bolts is labor intensive, especially when many duct sections are installed in a building or in a plurality of buildings.

Accordingly, it would be highly desirable to provide an improved method and apparatus for securing together pairs of opposing angle plates in which each angle plate is mounted on the end of a different duct section.

Therefore, it is a principal object of the invention to provide an improved method and apparatus for connecting the opposing, adjacent ends of a pair of air ducts.

Another object of the invention is to provide an improved connection method and apparatus which significantly reduces the time required to connect the opposing ends of a pair of ducts.

A further object of the invention is to provide an improved connector assembly for a pair of angle plates which permits the plates to be rapidly disconnected.

These and other, further and more specific objects and advantages of the invention will be apparent to those skilled in the art from the following detailed description thereof, taken in conjunction with the drawings, in which:

Briefly, in accordance with my invention, I provide an improved connection apparatus for joining together a duct assembly. The duct assembly includes a first air duct section including a least one wall (10) having an end with a leading edge (11); a first flange on the end of the first air duct section; a first angle plate including an end mounted on the first flange and including a first aperture formed therethrough; a second air duct section including at least one wall having an end with a leading edge; a second flange on the end of the second air duct section and adjacent the first flange; and, a second angle plate including an end mounted on the second flange and including a second aperture formed therethrough. The second angle plate is adjacent the first angle plate such that the first and second apertures are in registration. The connection apparatus includes a compression unit and a compression member. The compression unit includes a foot adjacent the first angle plate; a body connected to the foot and extending from the foot through the first and second apertures; and, a head connected to the body and extending outwardly from the second angle plate. The compression member is mounted on the head and is moveable between a first operative position and a second operative position. In the second operative position, the compression member is shaped and dimensioned to displace the head outwardly away from the second angle plate, and to pull the foot against the first angle plate.

In another embodiment my invention, I provide an improved method for joining together a duct assembly. The duct assembly includes a first air duct section including a least one wall (10) having an end with a leading edge (11); a first flange on the end of the first air duct section; a first angle plate including an end mounted on the first flange and including a first aperture formed therethrough; a second air duct section including at least one wall having an end with a leading edge; a second flange on the end of the second air duct section and adjacent the first flange; and, a second angle plate including an end mounted on the second flange and including a second aperture formed therethrough. The second angle plate is adjacent the first angle plate such that the first and second apertures are in registration. The improved method includes the step of providing a compression unit. The compression unit includes a foot; a body connected to the foot; and, a head connected to the foot. The improved method also includes the step of providing a compression member which is mountable on the head and moveable between a first operative position, and a second operative position in which the compression member displaces the head. The improved method also includes the steps of mounting the compression unit on the angle plates such that the foot is adjacent the first angle plate, such that body extends from the foot through the first and second apertures, and such that the head extends outwardly from the second angle plate; mounting the compression member on the head in the first operative position; and, moving the compression member from the first operative position to the second operative position to displace the head and pull the foot against the first angle plate.

Turning now to the drawings, which depict the presently preferred embodiments of the invention for the purpose of illustrating the practice thereof and not by way of limitation of the scope of the invention, and in which like reference characters refer to corresponding elements throughout the several views, an air conditioning or other duct section 9 (FIG. 5) includes four sheet-metal walls 10, 12, 13 and 14. Wall 10 has an inner surface 16 and outer surface 15. At the end of the duct section 9 are four flange connectors 20 each typically consisting of endlessly rolled sheet metal. Each connector 20 slips over or is otherwise mounted on and extends parallel to one of end edges 16, 60, 61, 62 of duct 9. The four connectors 20 are joined together by four angle plates or corners 21 (FIG. 4) whose ends or legs 22 and 23 each fit at least in part into one of connectors 20. Corners 21 also each include at least one aperture 88 formed therethrough and include outwardly projecting edges or lips 86, 87 attached to legs 22, 23, respectively.

Each corner 20 includes back stays 40 and 50 which extend along the inside and parallel to a wall 10, 12, 13 14.

Figure 1:
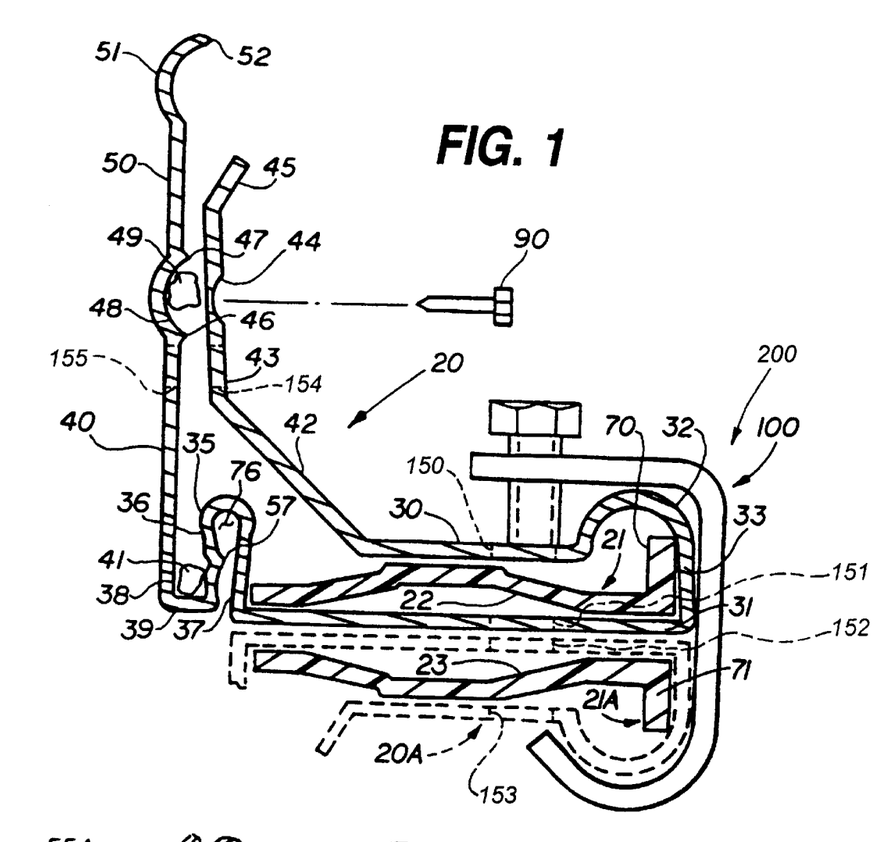
FIG. 1 is an end section view illustrating a conventional flange connector 20 mounted on one edge of the end of a first air duct section, and illustrating one end of an angle plate 21 mounted in the flange connector 20 and opposed to and in registration with a second angle plate 21A of equal shape and dimension mounted in a flange connector 20A that is mounted on the opposing edge of the end of a second air duct section.
Figure 2:
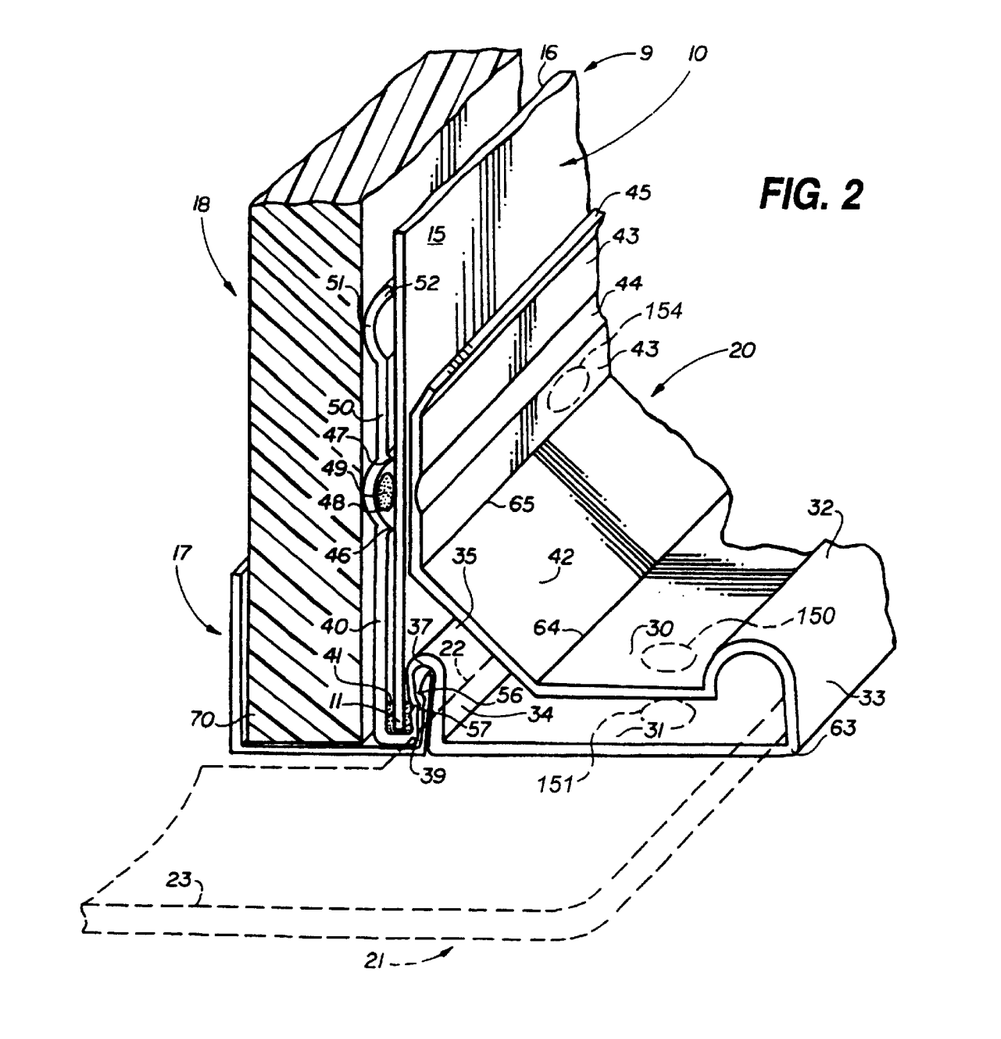
FIG. 2 is a perspective view further illustrating the flange connector 20 and angle plate 21 of FIG. 1.

For sake of example, wall 10 is illustrated in FIG. 2. Stays 40 and 50 are interconnected by elongate arcuate member 48. Member 48 is provided with a sealer composition and defines a concave detent which helps retain the sealer composition in position in member 48. Elongate V-shaped ridges 46 and 47 extend outwardly from the top and bottom (in FIGS. 1 and 2) of member 48, and, as will be described, function as mechanical seals when a wall 10, 12, 13, 14 is inserted in a connector 20 in the manner illustrated in FIG. 2. After a 90 degree bend, stay 40 runs into stay 39. Stay 39, after a 90 degree bend, runs into catch strip 36. V-shaped outwardly projecting ridge 57 extends outwardly from catch strip 36. One hundred and eighty degree bend 35 interconnects strip 36 and stay 37. Strip 36, bend 35, and stay 37 bound and define elongate open aperture 76 extending parallel to edge 11. After a ninety degree bend, stay 37 runs into stay 31. After a ninety degree bend 63, stay 31 runs into narrow cross stay 33, followed by a 180 degree bend which runs into stay 30. After a forty-five degree bend 64, sloping stay 42 runs into forty-five degree bend 65, followed by cover stay 43. Duct wall 10 lies against the inside of cover stay 43. Elongate arcuate groove 44 is formed in stay 43 and is opposed and generally parallel to groove 48. Arcuate projection 51 extends outwardly from stay 50 and includes strip 52 which, as will be described, functions as a mechanical seal.

Figure 3:
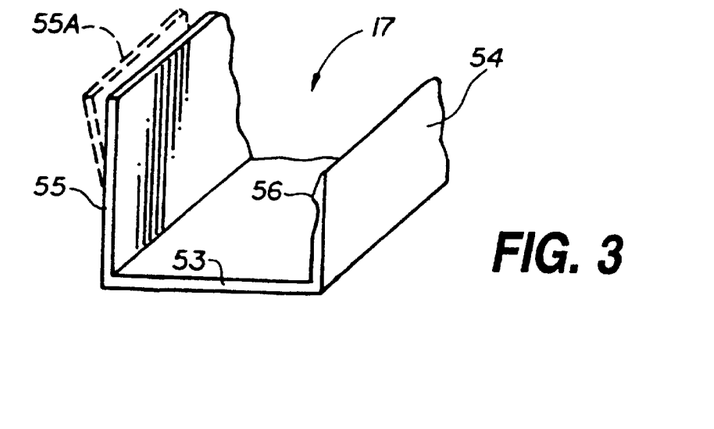
FIG. 3 is a partial perspective view illustrating a U-shaped strip used to secure an insulating mat to the inner wall of an air duct section and to the flange connector 20 of FIG. 1.

In FIG. 3, holding strip 17 is continuously roll formed from a strip of galvanized steel. Strip 17 includes outer wall 55, flat cross piece 53 and catch strip 54. The upper portion of outer wall 55 can flare outwardly in the manner indicated by dashed lines 55A in FIG. 3. V-shaped ridge 56 extends inwardly from strip 54. Wall 55 runs into piece 53 after a ninety degree bend. Piece 53 runs into catch strip 54 after about a ninety degree bend. Strip 54 fits into aperture 37. Ridge 56 snaps over ridge 57 in the manner illustrated in FIG. 2. Insulating material 18 fits into strip 17 and is held adjacent wall 10 and stays 40 and 50 in the manner illustrated in FIG. 2. Strip 17 can be cemented to material 18, or strip 17 can be shaped and dimensioned such that the edge 70 must be squeezed and force fit into strip 17 such that the compressive forces generated on edge 70 by strip 17 secure edge 70 in strip 17. Threaded fasteners or any other desired means can be used to secure edge 70 in position in strip 17.

In use, an edge 11 of a wall 10 of duct 9 section is slid into a connector 20 in the manner illustrated in FIG. 2. Wall 10 is compressed between stay 43 and ridges 46 and 47 to form a pair of mechanical seals. Projection 51 is shaped and dimensioned such that strip 52 bears against wall 10 and forms a third mechanical seal. Sealing material 49 extends between member 48 and wall 10. Material 49 can also, though not shown, extend between wall 10 and stay 40, stay 39, and catch strip 36. Groove 44 indicates to a user where a welding spot can be made which extends from groove 44 generally perpendicular to stays 43 and 50 and through stay 3, wall 10, and member 48. Instead of or in addition to welding spots, screws or other fasteners can be turned through stay 43, wall 10 and member 48.

In FIG. 1, flange connector 20A is attached to edge 11A of duct section 8 (FIG. 5), and U-shaped clamp 100 is used in conventional fashion to secure together connectors 20, 20A, and, subsequently, duct sections 8 and 9. Connectors 20, 20A are of equivalent shape and dimension. Alternatively, adjacent parallel flange connectors 20 and 20A on opposing edges 11 and 11A of duct sections 8 and 9, respectively, can be held together by, in conventional fashion, inserting a bolt through apertures 88 of each pair 21, 21A of opposing, registered angle plates. As earlier noted, for the end of each duct section 8, 9 in FIG. 5, four angle plates 21 are used to connect together four lengths of flange connector 20 mounted on the end of the duct section. Each one of the four lengths of flange connector 20 used for the end of a duct section is mounted over and extends along substantially the entire length of a different one of the four edges of the end of a duct section 8, 9.

Figure 5:
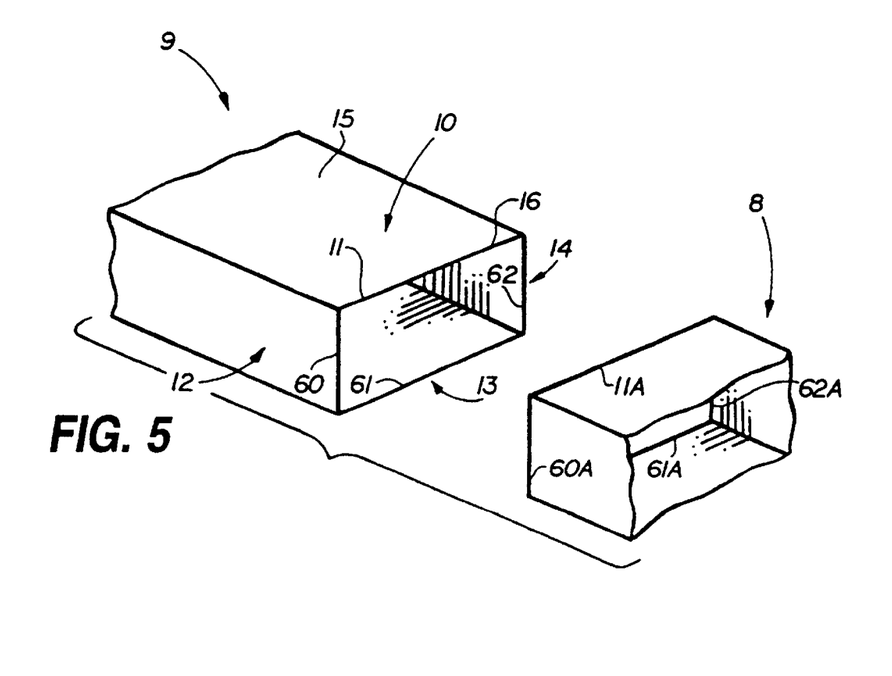
FIG. 5 is a perspective view illustrating a pair of air duct sections with opposing, parallel ends which can be placed adjacent one another and interconnected with flange connectors and angle plates of the type illustrated in FIGS. 1 to 4.

For example, for duct section 9, a different flange connector 20 is mounted over each of edges 11, 60, 61, 62. One flange connector 20 extends along edge 11, another connector 20 extends along edge 61, another connector 20 extends along edge 62, and another connector 20 extends along edge 60. At the corner where edges 11 and 62 co-terminate, one angle plate 21 interconnects the ends of flange connectors 20 along edges 11 and 62. At the corner where edges 11 and 60 coterminate, a second angle plate 21 interconnects the ends of flange connectors 20 along edges 11 and 60. At the corner where edges 60 and 61 co-terminate, a third angle plate 21 interconnects the ends of flange connectors 20 along edges 60 and 61. At the corner where edges 61 and 62 co-terminate, a fourth angle plate 21 interconnects the ends of flange connectors 20 along edges 61 and 62. Each flange connector 20 has two ends.

In a manner like that described for duct section 9, four flange connectors 20 are each mounted over a different one of each of edges 11A, 60A, 61A, and 62A and four angle plates 21A are used to interconnect the corners of the four pieces of flange connector 20. Angle plates 21 and 21A ordinarily are of equal shape and dimension, but their shape and dimension can vary as desired.

Figure 4:
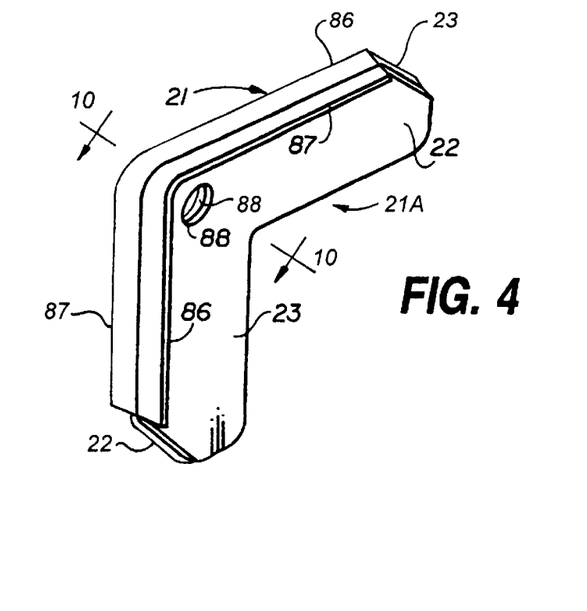
FIG. 4 is a perspective view illustrating the angle plates 21, 21A opposing one another and in registration in the manner also depicted in FIG. 1.

The angle plate 21 on duct section 9 at the corner where edges 11 and 60 intersect is placed in registration with and in contact with the angle plate 21A on the duct section 8 at the corner where edges 11A and 60A intersect. Plates 21 and 21A are in registration in the manner illustrated in FIG. 4. A bolt is placed through the apertures 88 in the angle plates 21 and 21A to secure together the plates and the ends of duct sections 8 and 9. Since the purpose of FIG. 4 is to illustrate the registration of plates 21 and 21A, the flange connectors 20 and duct sections 8, 9 are omitted from FIG. 4 for the sake of clarity. Similarly, the angle plate 21 on duct section 9 at the corner where edges 11 and 62 intersect is placed in registration with the angle plate 21A on the duct section 8 at the corner where edges 11A and 62A intersect; the angle plate 21 on the duct section 9 at the corner where edges 61 and 60 intersect is placed in registration with the angle plate 21A on the duct section 8 where edges 61A and 60A intersect; and, the angle plate 21 on the duct section 9 at the corner where edges 61 and 62 intersect is placed in registration with the angle plate 21A on the duct section 8 where edges 61A and 62A intersect. The opposing pairs of angle plates are connected and secured together with a bolt which passes through the aperture 88 in each angle plate in the pair.

Instead of using a bolt through apertures 88 in FIG. 4, I have discovered a connection apparatus which can be utilized to quickly secure together a pair of opposing angle plates 21, 21A. The connection apparatus includes the unitary compression unit 100 illustrated in FIGS. 6 and 7. Unit 100 includes feet 113, 114. One foot 113 includes edge 119 and flat side 115 connected to bottom 116. The other foot 114 includes edge 120 and flat side 118 connected to bottom 117. Edge 119 is parallel to and spaced apart from edge 120.

Figure 6:
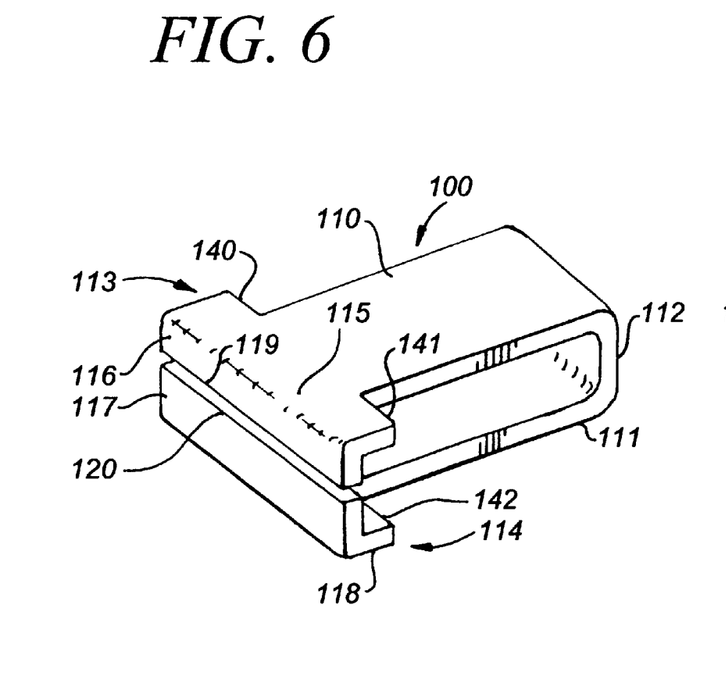
FIG. 6 is a perspective view illustrating a compression unit utilized in accordance with the principles of the invention.
Figure 7:
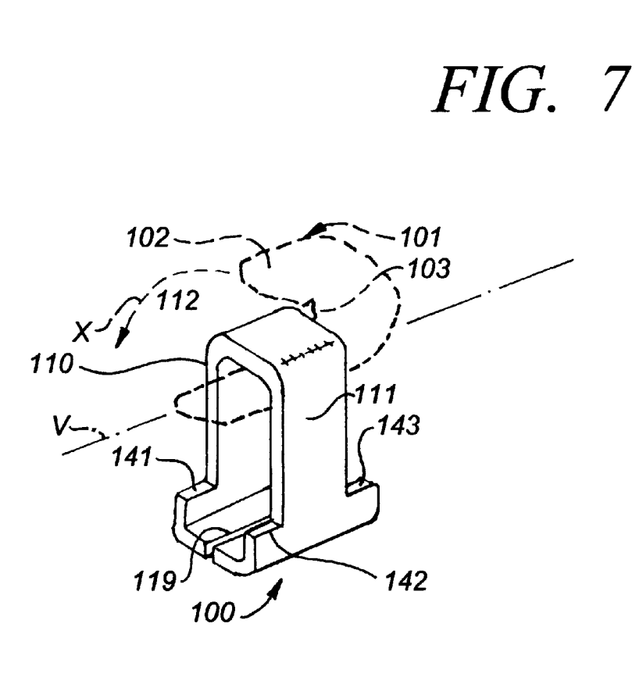
FIG. 7 is a perspective view illustrating further construction details of the compression unit of FIG. 6.

Feet 113, 114 are connected to the body of unit 100. The body of unit 100 includes member 110 connected to foot 113 and member 111 connected to foot 114. Head 112 is connected to the body of unit 100.

Figure 8:
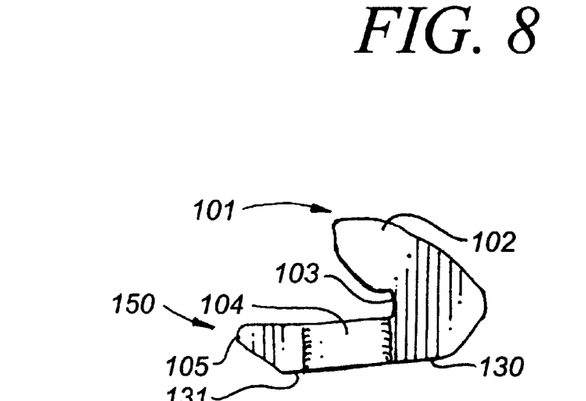
FIG. 8 is a side elevation view of a compression member utilized in the practice of the invention.
Figure 9:
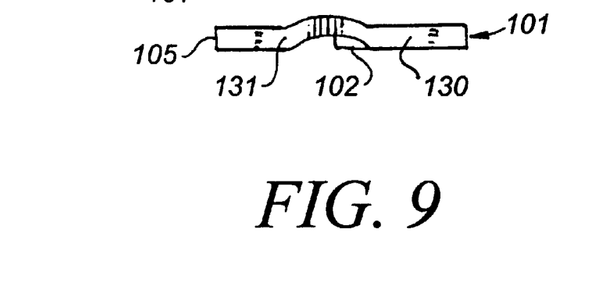
FIG. 9 is a bottom view of the compression member of FIG. 8.

The connection apparatus also includes unitary compression member or key 101 having head 102 and a leg 150 attached to head 102. The leg 150 includes tip 105, arcuate portion 104, and bottom substantially flat surfaces 130 and 131. Notch 103 is intermediate head 102 and the leg 150.

Figure 10:
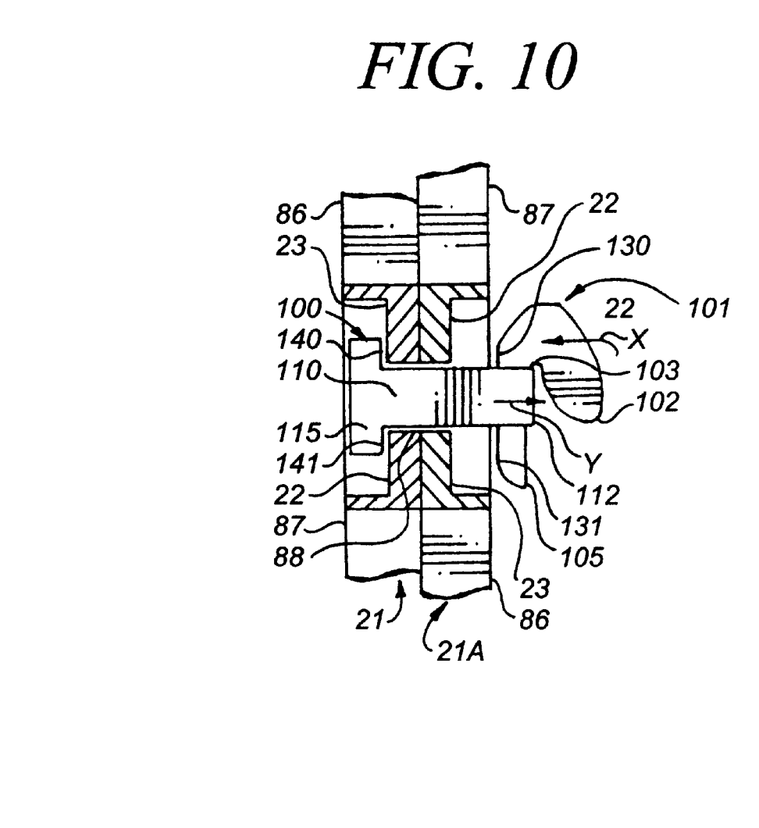
FIG. 10 is a partial section view of the opposed, registered angle plates of FIG. 4 illustrating the mode of operation of the invention.

In use, compression unit 100 is mounted in the manner illustrated in FIG. 10 in apertures 88 of a pair of registered, opposing angle plates. The body of unit 100 extends through apertures 88. The feet 113 and 114 are adjacent plate 21. Head 112 extends outwardly from plate 21A.

The leg 150 of compression member 101 is then slid into unit 100 to the position illustrated in FIGS. 7 and 10. Leg 150 is between plate 21A and head 112. Head 102 is then grasped manually or with a tool and is rotated in the direction of arrow X until head 102 contacts angle plate 21A. Unit 100 and member 101 are shaped and dimensioned such that when head 102 is grasped and turned to rotate member 101 in the direction of arrow X, arcuate portion 104 turns up against head 112 and at least a portion of surfaces 130 and 131 continue to contact angle plate 21A such that portion 104 forces head 112 away from plate 21A in the direction of arrow Y and, as a result, pulls surfaces 140 to 143 of feet 113 and 114 against plate 21 in the direction of arrow Y to press or force plate 21 against plate 21A.

The shape and dimension and construction of unit 100 and member 101 can be varied as desired as long as unit 101 (or 100) can be moved to cause unit 100 to compress together a pair of adjacent, registered plates 21, 21A. In the presently preferred embodiment of the invention, portion 104 functions in the manner of a cam surface to push head 112 away from plate 21A while other portions of the leg of member 101 continue to contact plate 21A.

In FIG. 10, the leg 150 of member 101 is, for sake of clarity, shown spaced slightly apart from plate 21A. In practice, however, at least a portion of the leg 150 of member 101 presently normally always contacts a plate 21A.

When head 102 is grasped and moved in the direction of arrow X, the leg of member 101 generally rotates about an axis V (FIG. 7). Axis V is parallel to legs 113, 114 and edge 119.

Unit 100 and member 101 are presently preferably fabricated from aluminum or steel. The material utilized to construct unit 100 and member 101 can vary as desired.

Advantages of the connection apparatus of FIGS. 6 to 10 are that unit 100 and member 101 are quickly installed in pair of opposed, registered plates 21, 21A and are of simple and inexpensive manufacture.

As would be appreciated by those of skill in the art, unit 100 and member 101 can be sized to connect together any flange connectors, to connect a flange connector to a portion of a duct, or to connect together any structural components and/or duct parts when adjacent duct ends are being interconnected. For example, and not by way of limitation, unit 100 can, with reference to FIGS. 1 and 2, be extended through registered (i.e., aligned) apertures 150, 151, 152, 153 such that feet 113, 114 bear against stay 30 and such that head 112 extends outwardly from aperture 153 and connector 20A. Member 101 is inserted in head 112 in the manner illustrated in FIGS. 7 and 10 and is turned in the direction of arrow X against connector 20A. Similarly, in FIG. 2 registered apertures can be formed through stays 40 and 43 and wall 10. Such apertures can include aperture 154 in stay 43 and aperture 155 in stay 40 (FIGS. 1 and 2). Unit 100 can be extended through the registered apertures such that feet 113, 144 bear against stay 43 and such that head 112 extends outwardly from aperture 155 and stay 40. Member 101 is inserted in head 112 in the manner illustrated in FIGS. 7 and 10 and is turned in the direction of arrow X against stay 40.

In sum, unit 100 and member 101 can be provided in the appropriate size to be substituted for and utilized in place of a conventional bolt and nut in any situation in which a bolt is inserted through registered apertures to secure two members together and a nut is turned onto the bolt to secure the bolt in position in the registered apertures.

As described above, the flanges 20 and 20A and angle plates 21 and 21A can be utilized to interconnect the ends of conventional ducts 8, 9 of the type shown in FIG. 5. And, as discussed above, unit 100 and member 101 can be utilized to interconnect opposing adjacent flanges 20 and 20A and to interconnect opposing adjacent angle plates 21, 21A. As is well known in the art, however, there also exist so-called "TDC" and "TDF" ducts. TDC and TDF ducts are not formed in the manner of ducts 8, 9. TDC and TDF ducts do not include edges 60, 61, 62, 11. Instead, the end of each wall of a TDC or TDF duct is bent inwardly at an angle of ninety degrees to form, in essence, a flange wall which is perpendicular to and depends from the wall and which is shaped to receive an angle plate 21. In order to interconnect the ends of a pair of TDC or TDF ducts, the end of one duct is placed in registration with the end of another duct so that each flange wall on one duct is adjacent and opposing a flange wall on the end of the other duct. Angle plates are mounted in the flange walls such that they are in the general orientation shown in FIG. 4. Each pair of opposing angle plates can, as described above, be interconnected using a unit 100 and member 101.

Having described my invention in such terms as to enable those skilled in the art to understand and practice it and having described the presently preferred embodiments thereof, I claim:

1. A connection apparatus for joining together a duct assembly, said duct assembly including
    a first air duct section including at least one wall (10) having an end with a leading edge (11),
    a first flange on the end of the first air duct section,
    a first angle plate including an end mounted on the first flange and including a first aperture formed therethrough,
    a second air duct section including at least one wall having an end with a leading edge,
    a second flange on the end of the second air duct section and adjacent the first flange,
    a second angle plate including an end mounted on the second flange and including a second aperture formed therethrough, the second angle plate being adjacent the first angle plate such that the first and second apertures are in registration,
    said connection apparatus including
        (a) a compression unit including
            (i) a foot adjacent the first angle plate,
            (ii) a body connected to said foot and extending from said foot through the second and first apertures, and
            (iii) a head connected to said body and extending outwardly from the second angle plate; and,
        (b) a compression member mounted on said head, including a leg with a displacement surface (104), said leg extending intermediate said head and the second angle plate, said compression member pivotable between
            (i) a first operative position, and
            (ii) a second operative position, said leg and displacement surface being shaped and dimensioned to, in said second operative position
                displace said head outwardly away from the second angle plate, and
                pull said foot against said first angle plate.

2. The apparatus of claim 1 wherein said compression member includes a head that is attached to said leg and pivots simultaneously with said leg when said compression member pivots from said first to said second operative position.

3. A method for joining together a duct assembly, said duct assembly including
    a first air duct section including at least one wall (10) having an end with a leading edge (11),
    a first flange on the end of the first air duct section,
    a first angle plate including an end mounted on the first flange and including a first aperture formed therethrough,
    a second air duct section including at least one wall having an end with a leading edge,
    a second flange on the end of the second air duct section and adjacent the first flange,
    a second angle plate including an end mounted on the second flange and including a second aperture formed therethrough, the second angle plate being adjacent the first angle plate such that the first and second apertures are in registration,
said method including the steps of
    (a) providing a compression unit including
        (i) a foot,
        (ii) a body connected to said foot, and
        (iii) a head connected to said body;
    (b) providing a compression member mountable on said compression unit, including a leg having a displacement surface, and, when mounted on said compression unit, pivotable between
        (i) a first operative position, and
        (ii) a second operative position in which said compression member is pivoted from said first operative position to alter the orientation of said displacement surface;
    (c) mounting said compression unit on the angle plates such that said foot is adjacent the first angle plate, said body extends from said foot through the first and second apertures, and said head extends outwardly from the second angle plate;
    (d) mounting said compression member on said compression unit such that said leg is positioned adjacent said head;
    (e) pivoting said compression member from said first operative position to said second operative position, said leg and displacement surface being shaped and dimensioned such that when said compression member is pivoted to said second operative position,
        (i) said leg contacts the second angle plate,
        (ii) said displacement surface contacts said head and generates a force against said head to
            displace said head outwardly away from the second angle plate, and
            pull said foot against the second angle plate.

4. The method of claim 3 wherein said compression member includes a head that is attached to said leg and pivots simultaneously with said leg when said compression member pivots from said first to said second operative position.

5. A connection apparatus for use in a duct assembly including a first air duct section including at least one wall (10) having an end with a leading edge (11), a first flange on the end of the first air duct section, a second air duct section including at least one wall having an end with a leading edge, a second flange on the end of the second air duct section and adjacent the first flange, at least first and second apertures each formed in registration in a different one of the components in the group consisting of said first air duct section, said first flange, said second air duct section, and said second flange, the connection apparatus including   (a) a compression unit including     (i) a foot adjacent a first one of said components,     (ii) a body connected to said foot and extending from said foot through the first and second apertures, and     (iii) a head connected to the body and extending outwardly from a second one of the components; and,   (b) a compression member operatively associated with the head, including a leg and a cam surface formed on the leg, said compression member pivotable between     (i) a first operative position with said leg and cam surface extending adjacent said head, and     (ii) a second operative position with said compression member pivoted from said first operative position such that said cam surface       contacts said head and displaces said head outwardly away from the second one of the components, and pulls said foot against the first one of the components.

6. The apparatus of claim 5 wherein said compression member includes a head that is attached to said leg and pivots simultaneously with said leg when said compression member pivots from said first to said second operative position.

\* \* \* \* \*